United States Patent
Ranjan et al.

(10) Patent No.: US 10,379,937 B2
(45) Date of Patent: Aug. 13, 2019

(54) MEMORY ARCHITECTURE INCLUDING RESPONSE MANAGER FOR ERROR CORRECTION CIRCUIT

(71) Applicants: STMicroelectronics International N.V., Schiphol (NL);
STMicroelectronics S.r.l., Agrate Brianza (IT)

(72) Inventors: Om Ranjan, New Delhi (IN);
Riccardo Gemelli, Carugate (IT);
Abhishek Gupta, Greater Noida (IN)

(73) Assignees: STMicroelectronics International N.V., Schiphol (NL);
STMicroelectronics S.r.l., Agrate Brianza (IT)

( * ) Notice: Subject to any disclaimer, the term of this patent is extended or adjusted under 35 U.S.C. 154(b) by 73 days.

(21) Appl. No.: 15/798,916

(22) Filed: Oct. 31, 2017

(65) Prior Publication Data

US 2019/0129790 A1    May 2, 2019

(51) Int. Cl.
*G06F 11/00* (2006.01)
*G06F 11/10* (2006.01)
*G06F 3/06* (2006.01)

(52) U.S. Cl.
CPC ............. *G06F 11/10* (2013.01); *G06F 3/064* (2013.01); *G06F 3/0619* (2013.01); *G06F 3/0673* (2013.01)

(58) Field of Classification Search
CPC ........ G06F 11/10; G06F 3/0619; G06F 3/064; G06F 3/0673; G06F 11/1004;
(Continued)

(56) References Cited

U.S. PATENT DOCUMENTS

| 5,247,523 A * | 9/1993 | Arai ................... G06F 11/10 714/748 |
| 7,502,986 B2 * | 3/2009 | O'Neill ............... G06F 11/10 714/769 |

(Continued)

FOREIGN PATENT DOCUMENTS

EP    2256634 A1    1/2010

OTHER PUBLICATIONS

EPO Search Report for EP 18201756 dated Feb. 15, 2019 (9 pages).

*Primary Examiner* — Christine T. Tu
(74) *Attorney, Agent, or Firm* — Crowe & Dunlevy

(57) ABSTRACT

A memory includes error correction circuitry that receives a data packet, outputs a correctable error flag indicating presence or absence of a correctable error in the data packet, and outputs an uncorrectable error flag indicating presence or absence of an uncorrectable error in the data packet. A response manager, operating in availability mode, generates output indicating that a correctable error was present if the correctable error flag indicates presence thereof, and generates an output indicating that an uncorrectable error was present if the uncorrectable error flag indicates presence thereof. In a coverage mode, the response manager generates an output indicating that a correctable error was potentially present but should be treated as an uncorrectable error if the correctable error flag indicates presence of the correctable error, and generates an output indicating that an uncorrectable error was present if the uncorrectable error flag indicates presence thereof.

23 Claims, 1 Drawing Sheet

(58) Field of Classification Search
CPC .............. G06F 11/1008; G06F 11/1076; G06F 11/102; G06F 11/1024; G06F 11/1032; G06F 11/1044; G06F 11/1048; G06F 11/106; H03M 13/19; H03M 13/09; H03M 13/15; H03M 13/2096; H03M 13/152

See application file for complete search history.

(56) References Cited

U.S. PATENT DOCUMENTS

| | | | |
|---|---|---|---|
| 8,812,898 B1* | 8/2014 | Lahon | G06F 11/10 714/4.2 |
| 2014/0189427 A1 | 7/2014 | Jayaprakash Bharadwaj et al. | |
| 2014/0380132 A1 | 12/2014 | Ran | |

* cited by examiner

MEMORY ARCHITECTURE INCLUDING RESPONSE MANAGER FOR ERROR CORRECTION CIRCUIT

TECHNICAL FIELD

This disclosure relates to the field of error correction in data communications, and in particular, to circuitry for increasing coverage against greater than two-bit errors over prior error correction circuitry.

BACKGROUND

In digital communications, bit errors may sometimes occur during data transmission. For example, an intended sequence of bits may be transmitted in a wired or wireless fashion, but when received, one or more of the bits may not be correctly received (e.g. a bit that was transmitted as a 0 is received as a 1). Since this is clearly an undesirable scenario, a variety of error detection and correction codes have been developed.

A simple known error detection technique is referred to as parity. Parity adds a single bit to a packet that indicates whether the number of ones (bit-positions with values of one) in the preceding data of the packet was even or odd. If an odd number of bits is changed in transmission, the message will change parity and the error is thus detected at this point; however, one drawback is that the bit that changed may have been the parity bit itself. The most common convention for the use of parity is that a parity value of one indicates that there is an odd number of ones in the data, and a parity value of zero indicates that there is an even number of ones in the data. If the number of bits changed is even, the check bit will be valid and the error will not be detected.

However, parity does not indicate which bit contained the error, even when it can detect the error. Once an error is detected using parity, the data must then be discarded entirely and re-transmitted from scratch. Over a noisy transmission medium, a successful re-transmission could take an undesirably long time, or may never in fact occur. Therefore, the overall quality and usefulness of parity checking on its own is poor. However, while the quality of parity checking is poor, since it uses only a single bit, this method results in minimal overhead, is simple to implement, and naturally, is better than no error checking.

Another known error detection technique is known as a two-out-of-five code. A two-out-of-five code is an encoding scheme which uses five bits—three zeroes and two ones. This provides ten possible combinations, enough to represent the digits 0-9. This scheme can therefore detect all single bit-errors, all odd numbered bit-errors, and some even numbered bit-errors (for example the flipping of both 1-bits). However, while this error detection technique can detect more errors than simple parity checking, it cannot correct any of the errors that it detects.

A known error detection and error correction technique is modular redundancy. With modular redundancy, every data bit is repeated multiple times in order to ensure that it was sent correctly. For instance, if the data bit to be sent is a 1, an n=3 repetition code will send 111. If the three bits received are not identical, an error occurred during transmission. If the transmission channel or medium is clean enough, most of the time only one bit will change in each triple. Therefore, 001, 010, and 100 each correspond to a 0 bit, while 110, 101, and 011 correspond to a 1 bit, as though the bits count as "votes" towards what the intended bit is. Since this code has the ability to reconstruct the original message in the presence of errors, it is known as an error-correcting code.

Such codes cannot correctly repair all errors, however. For example, if the channel flips two bits and the receiver receives 001, the system will detect the error, but conclude that the original bit is 0, which is incorrect. If the number of times each bit is duplicated is increased to four, all two-bit errors may be detected but correction is not possible, as the votes "tie". At five repetitions for each bit, all two-bit errors can be corrected, but not all three-bit errors. Therefore, it can be seen that a modular repetition code is extremely inefficient, reducing throughput by a number of times equal to the number of repetitions used, and the efficiency drops drastically. This increases the number of times each bit is duplicated in order to detect and correct more errors.

Therefore, the development of a technique for detecting a large percentage of errors, while maintaining capability of correcting at least an acceptable percentage of errors, that does not utilize a large overhead, and that is not overly inefficient is needed.

SUMMARY

Disclosed herein is a memory architecture including error correction circuitry configured to receive a data packet, and determine whether a correctable error is present in the data packet, and output a correctable error flag indicating presence or absence of the correctable error in the data packet. The error correction circuitry is also configured to determine whether an uncorrectable error is present in the data packet, and output an uncorrectable error flag indicating presence or absence of the uncorrectable error in the data packet. The memory architecture also includes a response manager circuit. The response manager circuit has an OR gate receiving the correctable error flag and uncorrectable error flag as inputs, and generating output. An AND gate receives the correctable error flag and a mode select signal as inputs, and generates a first output. A multiplexer receives the uncorrectable error flag and the output of the OR gate as input, and generates a second output in response to the mode select signal.

When the mode select signal indicates that the response manager circuit is to operate in an availability mode, the first output indicates that a correctable error was present in the data packet if the correctable error flag indicates presence of the correctable error in the data packet, and the second output indicates that an uncorrectable error was present in the data packet if the uncorrectable error flag indicates presence of the uncorrectable error in the data packet.

When the mode select signal indicates that the response manager circuit is to operate in a coverage mode, the first output indicates that a correctable error was potentially present in the data packet but should be treated as an uncorrectable error if the correctable error flag indicates presence of the correctable error in the data packet, and the second output indicates that an uncorrectable error was present in the data packet if the uncorrectable error flag indicates presence of the uncorrectable error in the data packet.

The response manager circuit may determine whether to enter availability mode or coverage mode as a function of at least one received operating condition of the circuit.

The response manager circuit may determine whether to enter availability mode or coverage mode as a function of a received configuration profile.

The memory architecture may include a first memory having a first memory type, a second memory having a second memory type different than the first memory type, and physical interface circuitry coupling the first memory and the second memory to the error correction circuitry. The response manager circuit determines whether to enter availability mode or coverage mode based upon whether the data packet was received from the first memory or the second memory.

The first memory type may be a less reliable memory type than the second memory type such that an error in transmission of data from the first memory is more likely than an error in transmission of data from the second memory.

The first memory type may be double data rate synchronous dynamic random-access memory.

The error correction circuitry may be Hamming error correction circuitry.

Also disclosed herein is a memory architecture including error correction circuitry configured to receive a data packet, determine whether a correctable error is present in the data packet, and output a correctable error flag indicating presence or absence of the correctable error in the data packet, and determine whether an uncorrectable error is present in the data packet, and output an uncorrectable error flag indicating presence or absence of the uncorrectable error in the data packet. A response manager circuit is configured to receive the correctable error flag and the uncorrectable flag, and in an availability mode, generate an output indicating that a correctable error was present in the data packet if the correctable error flag indicates presence of the correctable error in the data packet, and generate an output indicating that an uncorrectable error was present in the data packet if the uncorrectable error flag indicates presence of the uncorrectable error in the data packet. In a coverage mode, the response manager circuit is configured to generate an output indicating that a correctable error was potentially present in the data packet but should be treated as an uncorrectable error if the correctable error flag indicates presence of the correctable error in the data packet, and generate an output indicating that an uncorrectable error was present in the data packet if the uncorrectable error flag indicates presence of the uncorrectable error in the data packet.

Also disclosed herein is a method aspect. The method is a method of operating an electronic device, and includes receiving a data packet, determining whether a correctable error is present in the data packet, determining whether an uncorrectable error is present in the data packet, and determining whether to enter coverage mode or availability mode. In the availability mode, the method includes indicating that a correctable error was present in the data packet, and generate an output indicating that an uncorrectable error was present in the data packet if an uncorrectable error was in the data packet. In a coverage mode, the method include indicating that a correctable error was potentially present in the data packet but should be treated as an uncorrectable error, and generating an output indicating that an uncorrectable error was present in the data packet if an uncorrectable error was present in the data packet.

DETAILED DESCRIPTION

Figure 1:
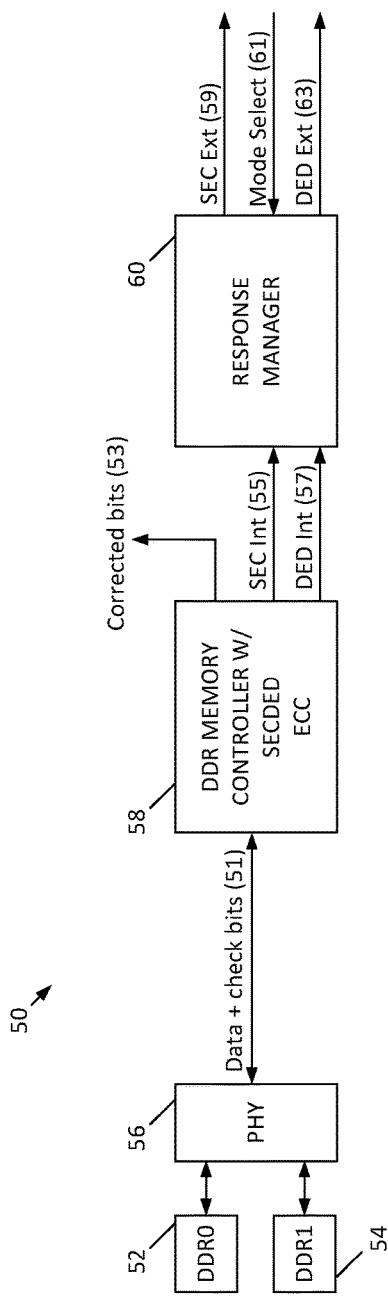
FIG. 1 is a block diagram of a first embodiment of a memory circuit including error correction in accordance with this disclosure.

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout, and prime notation is used to indicate similar structures in different embodiments.

A first embodiment of a memory architecture 50 including error correction is now described with reference to FIG. 1. The memory architecture 50 includes first and second double data rate (DDR) synchronous dynamic random-access memory (SDRAM), designated as DDR0 52 and DDR1 54, and each coupled to a physical interface (PHY) 56. The physical interface 56 is coupled to a memory controller 58 with an error correcting circuit incorporated therein or associated therewith. The physical interface 56 is a double data rate synchronous dynamic random-access memory interface so to enable proper communication with DDR0 52 and DDR1 54, and the error checking performed is of the Hamming type with an additional parity bit, referred to as SECDED (i.e. single error correction, double error detection).

The minimum distance of this SECDED error correction is four, which is to say that the minimum number of positions in which any two distinct codewords differ is four. This allows the error correction to distinguish between single bit errors and two-bit errors in a given packet. Thus, a single error can be detected and corrected while at the same time detecting (but not correcting) a double error. SECDED detection is known to those of skill in the art and therefore the details thereof need not be described herein.

The physical interface 56 sends data packets comprised of data bits and check bits 51 to the memory controller 58, which performs the aforementioned error correction. The memory controller 58 determines whether a correctable error (single bit error) is present in a received data packet and generates a SEC Int signal 55 indicating as such, as output. The memory controller 58 also determines whether an uncorrectable error (two-bit error) is present in the received data packet and generates a DED Int signal 57 indicating as such, as output. If a correctable error was detected, then a new packet containing corrected bits 53 is generated and output by the memory controller 58.

A response manager 60 receives the SEC Int signal 55 and the DED Int signal 57. If the operating conditions of the memory architecture 50 are such that where there is the occurrence of faults in the data packet within the reliable operation limits of the provided SECDED error correction (i.e. there is possibility of only one or two-bit faults), the response manager 60 operates in an availability mode, allowing the correction of one-bit faults and the detection of two-bit faults, and passing the SEC Int signal 55 and DED Int signal 57 as the SEC Ext signal 59 and the DED Ext Signal 63 as outputs, respectively. This availability mode is so called because the error correction and possibility of only one-bit and two-bit faults leads to a high availability of the memory architecture 50.

However, if the operating conditions of the memory architecture are such that there is a high presence of noise, and possible fault conditions include more bit faults than the limit of correction and detection provided by the SECDED (e.g. three or more bit errors), the response manager 60 operates in a coverage mode in which a correctable fault indication is treated as an uncorrectable error, since a three-bit or greater error, which is not correctable, may be detected by SECDED as a single-bit correctable error. Therefore, in the coverage mode, if the SEC Int signal 55 indicates potential presence of a single-bit correctable error (potential since this may actually be incorrect and instead represent presence of a three-bit or higher uncorrectable error), or if the DED Int signal 57 indicates presence of a double-bit uncorrectable error, the DED Ext signal 63 is asserted to indicate the potential presence of uncorrectable errors, while the SEC Ext signal 59 is not asserted. The coverage mode is so called because this operation reduces availability of the system, but reliably detects the presence of faults, therefore enhancing the fault detection coverage provided by the system.

The selection between the availability mode and the coverage mode may be made by the response manager 60, or by an external entity. This selection may be made based upon information about the operating conditions of the memory architecture 50, which may be received from external sources such as sensors, or a microprocessor or system-on-a-chip in communication with such sensors. The operating conditions may include temperature, background electromagnetic radiation, or any other operating conditions of concern. This selection may additionally or alternatively be made based upon configuration provided by external entity, such as a microprocessor or system-on-a-chip, or provided during device fabrication.

Figure 2:
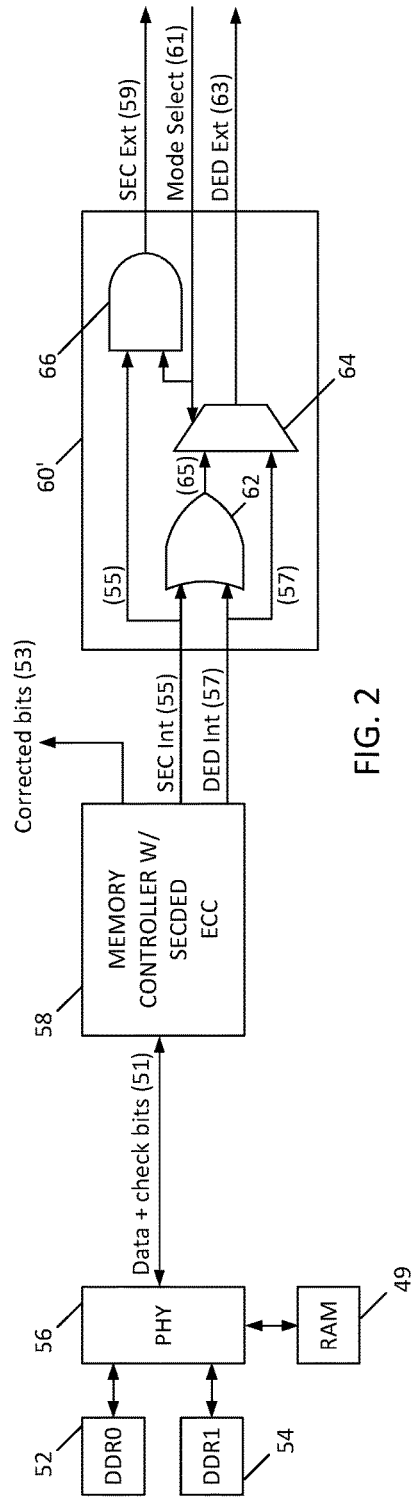
FIG. 2 is a block diagram of a second embodiment of a memory circuit including error correction in accordance with this disclosure.

Still further, this selection may additionally or alternatively be made on a packet by packet basis based upon which specific memory sent the data packet. For example, the memory architecture 50 may include a DDR memory and a non-DDR memory, and coverage mode may be activated when data is to be received from the DDR memory, while availability mode may be activated when data is to be received from the non-DDR memory. Such an embodiment is illustrated in FIG. 2, in which DDR memories DDR0 52 and DDR1 54, as well as a non-DDR RAM 49, are coupled to the physical interface 56.

As explained above, the advantage of the memory architecture 50 including the response manager is that SECDED may indicate the presence of a single-bit correctable error and a lack of presence of a double-bit uncorrectable error when, in reality, a three-bit or greater error is present, but may now be used in coverage mode to reliably detect three-bit or greater errors. This is particularly useful in applications where DDR RAM is employed, as DDR RAM is prone to high fault rates (e.g. three-bit or greater errors). Moreover, accurate error detection of three-bit or greater errors allows for the expansion of the use of DDR RAM (and its high throughput rate) into applications in which it is not conventionally used, such as safety and automotive applications.

One specific architecture for the response manager 60' is now described with reference to FIG. 2. Here, the response manager 60' includes an OR gate 62 that receives the SEC Int signal 55 and DED Int signal 57, and generates output 65 based thereupon. A multiplexer 64 receives the output 65 from the OR gate 62 as input, as well as the DED Int signal 57. The multiplexer 64 is controlled by a received mode select signal 61 that indicates whether availability mode or coverage mode is to be used. The multiplexer 64 generates the DED Ext signal 63. An AND gate 66 receives as input the SEC Int signal 55, as well as the mode select signal 61. The AND gate 66 generates the SEC Int signal 59.

It should be appreciated, however, that other architectures may be used for the response manager 60'. It should also be appreciated that while the memory architectures herein have been described with respect to the error correction used being SECDED, the principles herein may be applied to architectures using different kinds of error correction.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A circuit, comprising:
   error correction circuitry configured to:
   receive a data packet;
   determine whether a correctable error is present in the data packet, and in response thereto output a correctable error flag indicating presence or absence of the correctable error in the data packet;
   determine whether an uncorrectable error is present in the data packet, and in response thereto output an uncorrectable error flag indicating presence or absence of the uncorrectable error in the data packet; and
   a response manager circuit comprising:
   an OR gate receiving the correctable error flag and the uncorrectable error flag as inputs, and generating output;
   an AND gate receiving the correctable error flag and a mode select signal as inputs, and generating a first output; and
   a multiplexer receiving the uncorrectable error flag and the output of the OR gate as input, and generating a second output in response to the mode select signal.

2. The circuit of claim 1, wherein, when the mode select signal indicates that the response manager circuit is to operate in an availability mode, the first output indicates that a correctable error was present in the data packet if the correctable error flag indicates presence of the correctable error in the data packet, and the second output indicates that an uncorrectable error was present in the data packet if the uncorrectable error flag indicates presence of the uncorrectable error in the data packet.

3. The circuit of claim 1, wherein, when the mode select signal indicates that the response manager circuit is to operate in a coverage mode, the first output indicates that a correctable error was potentially present in the data packet but should be treated as an uncorrectable error if the correctable error flag indicates presence of the correctable error in the data packet, and the second output indicates that an uncorrectable error was present in the data packet if the uncorrectable error flag indicates presence of the uncorrectable error in the data packet.

4. The circuit of claim 2, wherein the response manager circuit determines whether to enter the availability mode or a coverage mode as a function of at least one received operating condition of the circuit.

5. The circuit of claim 2, wherein the response manager circuit determines whether to enter the availability mode or a coverage mode as a function of a received configuration profile.

6. The circuit of claim 2, further comprising:
a first memory having a first memory type;
a second memory having a second memory type different than the first memory type; and
physical interface circuitry coupling the first memory and the second memory to the error correction circuitry;
wherein the response manager circuit determines whether to enter the availability mode or a coverage mode based upon whether the data packet was received from the first memory or the second memory.

7. The circuit of claim 6, wherein the first memory type is a less reliable memory type than the second memory type such that an error in transmission of data from the first memory is more likely than an error in transmission of data from the second memory.

8. The circuit of claim 7, wherein the first memory type is double data rate synchronous dynamic random-access memory.

9. The circuit of claim 1, wherein the error correction circuitry comprises Hamming error correction circuitry.

10. A circuit, comprising:
error correction circuitry configured to:
receive a data packet;
determine whether a correctable error is present in the data packet, and in response thereto output a correctable error flag indicating presence or absence of the correctable error in the data packet;
determine whether an uncorrectable error is present in the data packet, and in response thereto output an uncorrectable error flag indicating presence or absence of the uncorrectable error in the data packet; and
a response manager circuit configured to receive the correctable error flag and the uncorrectable error flag, and:
in an availability mode, generate an output indicating that a correctable error was present in the data packet if the correctable error flag indicates presence of the correctable error in the data packet, and generate an output indicating that an uncorrectable error was present in the data packet if the uncorrectable error flag indicates presence of the uncorrectable error in the data packet; and
in a coverage mode, generate an output indicating that a correctable error was potentially present in the data packet but should be treated as an uncorrectable error if the correctable error flag indicates presence of the correctable error in the data packet, and generate an output indicating that an uncorrectable error was present in the data packet if the uncorrectable error flag indicates presence of the uncorrectable error in the data packet.

11. The circuit of claim 10, wherein the response manager circuit comprises:
an OR gate receiving the correctable error flag and the uncorrectable error flag as inputs, and generating output;
an AND gate receiving the correctable error flag and a mode select signal as inputs, and generating a first output; and
a multiplexer receiving the uncorrectable error flag and the output of the OR gate as input, and generating a second output in response to the mode select signal.

12. The circuit of claim 10, wherein the response manager circuit determines whether to enter availability mode or coverage mode as a function of at least one received operating condition of the circuit.

13. The circuit of claim 10, wherein the response manager circuit determines whether to enter availability mode or coverage mode as a function of a received configuration profile.

14. The circuit of claim 10, further comprising:
a first memory having a first memory type;
a second memory having a second memory type different than the first memory type; and
physical interface circuitry coupling the first memory and the second memory to the error correction circuitry;
wherein the response manager circuit determines whether to enter availability mode or coverage mode based upon whether the data packet was received from the first memory or the second memory.

15. The circuit of claim 14, wherein the first memory type is a less reliable memory type than the second memory type such that an error in transmission of data from the first memory is more likely than an error in transmission of data from the second memory.

16. The circuit of claim 15, wherein the first memory type is double data rate synchronous dynamic random-access memory.

17. The circuit of claim 10, wherein the error correction circuitry comprises Hamming error correction circuitry.

18. A method of operating an electronic device, comprising:
a) receiving a data packet;
b) determining whether a correctable error is present in the data packet;
c) determining whether an uncorrectable error is present in the data packet;
d) determining whether to enter coverage mode or availability mode;
e) in the availability mode, indicating that a correctable error was present in the data packet, and generate an output indicating that an uncorrectable error was present in the data packet if an uncorrectable error was in the data packet; and
f) in the coverage mode, indicating that a correctable error was potentially present in the data packet but should be treated as an uncorrectable error if a correctable error was present in the data packet, and generate an output indicating that an uncorrectable error was present in the data packet if an uncorrectable error was present in the data packet.

19. The method of claim 18, wherein whether to enter availability mode or coverage mode is determined as a function of at least one received operating condition of the electronic device.

20. The method of claim 18, wherein whether to enter availability mode or coverage mode is determined as a function of a received configuration profile.

21. The method of claim 18, wherein whether to enter availability mode or coverage mode is determined based upon whether the data packet was received from a first memory or a second memory.

22. The method of claim 21, wherein the first memory is of a first memory type; wherein the second memory is of a second memory type; and wherein the first memory type is a less reliable memory type than the second memory type such that an error in transmission of data from the first memory is more likely than an error in transmission of data from the second memory.

23. The method of claim 18, wherein a), b), and c) are performing using Hamming error correction.

\* \* \* \* \*